United States Patent [19]
Schubert

[11] 3,937,121
[45] Feb. 10, 1976

[54] DOUBLE BREAK-OFF SCREW
[75] Inventor: Keith E. Schubert, Rowayton, Conn.
[73] Assignee: Pitney-Bowes, Inc., Stamford, Conn.
[22] Filed: Apr. 14, 1975
[21] Appl. No.: 567,731

[52] U.S. Cl. .................................. 85/61; 85/9 R
[51] Int. Cl.² ........................................ F16B 31/02
[58] Field of Search ................ 85/9 R, 61, 62, 18

[56] References Cited
UNITED STATES PATENTS

| | | | |
|---|---|---|---|
| 1,970,071 | 8/1934 | Bengtsson | 85/61 |
| 3,444,775 | 5/1969 | Hills | 85/61 |
| 3,512,447 | 5/1970 | Vaugan | 85/61 |

FOREIGN PATENTS OR APPLICATIONS

| | | | |
|---|---|---|---|
| 638,195 | 5/1950 | United Kingdom | 85/61 |

Primary Examiner—Marion Parsons, Jr.
Attorney, Agent, or Firm—William D. Soltow, Jr.; Albert W. Scribner; Robert S. Salzman

[57] ABSTRACT

A double break-off screw fastener is described, which conceals its mode of fastening by means of a "dummy" free-floating middle shaft. The inventive screw contains three sections, a threaded section which does the actual fastening; a middle shaft section which helps to internally fasten the threaded section before breaking-off; and an outer head section which breaks from the middle shaft, thus leaving the middle shaft in a free-floating state. To the outer observer, the middle shaft is free turning giving the impression of a fastening screw. In reality, however, it is nothing more than a dummy member, which carefully conceals the well hidden internal screw thread.

9 Claims, 2 Drawing Figures

DOUBLE BREAK-OFF SCREW

The invention pertains to a break-off type screw, and more particularly to a double break-off screw which has means of concealing its mode of attachment.

BACKGROUND OF THE INVENTION

In security sensitive devices, such as safes, code machines, money exchanging machines, and postage meters, there often is need for fasteners which offer resistance to tampering and unauthorized attack. Such type fasteners feature hardened materials and smooth surfaces to prevent the destruction and gripping by sharp tools.

Sometimes dummy rivets or other type fasteners are used to slow the attempt at tampering by a would-be thief.

The present invention combines the above objectives into a combination break-off and dummy screw. The purpose of this combination provides several unexpected results:

a. The dummy portion of the screw hides a valid fastener beneath it, thus not only providing a fastening function, but also providing a deceiving function as well. If this type of fastener is now mixed with pure dummies, or with pure dummies and other break-off fasteners, the job of the would-be thief is greatly compounded, and becomes full of uncertainty.

b. The dummy portion of the screw, actually shields the internal fastener from attack. A would-be attacker would have to remove two screw parts just to unfasten one fastener. Thus, a thief would have to expend twice the ordinary work to remove just one of the inventive screws.

SUMMARY OF THE INVENTION

The invention is for a double break-off screw for use in security devices. The screw comprises an inner shaft having screw threads for screwing into an internal member of the machine. An intermediate shaft member is secured to the fastening portion through a narrowed break-off shaft. When the intermediate shaft is rotated, it fastens the threaded shaft until it seats in the screw hole. Then, additional rotation of the intermediate portion will cause it to break from the thread portion about the narrowed "necked" section. A third section of the inventive screw features a nut or screw head which is disposed externally of the security device. A wrench or screw driver is caused to rotate the head, which in turn causes the intermediate and fastener sections to rotate. The head section is secured to the intermediate section via a second narrow necked section. After the fastener has seated and the intermediate section has separated from the fastener section, the head section is bent and removed from the intermediate section, thus leaving a flat rivet-like head in the cover plate, which is freely rotatable. The flat rivet head is anchored to the intermediate section, which prevents its removal. The fastener section is protectively concealed below the intermediate section, which itself is partially concealed. No measure of turning or prying upon the flat head of the intermediate section will in any way loosen the fastener section. The fastener section internally joins an interior flange of the cover to an inner frame member of the security device.

It is an object of the invention to provide an improved fastener device;

It is another object of the invention to provide a break-off screw having a double break-off feature: and It is still another object of this invention to provide a new kind of fastener for security devices and machines.

These and other objects of the invention will be better understood and will become more apparent with reference to the following detailed description taken in conjunction with the accompanying drawings, in which:

FIG. 1 is a plan view of the inventive break-off screw shown in situ in the unassembled state; and FIG. 2 is a plan view of the inventive break-off screw shown in situ in the assembled state.

DETAILED DESCRIPTION

Generally speaking, the invention is for a double break-off screw comprising a head section, an intermediate shaft section, and a threaded fastening shaft section. A first narrow break-off shaft is disposed between the threaded fastening section and the intermediate section. The first break-off section is caused to torsionally shear when said intermediate section is rotated after the fastening section has seated. A second narrow break-off shaft is disposed between the head section and the intermediate section. The second break-off section is caused to flexurally shear when the head section is bent about the intermediate section.

Figure 1:
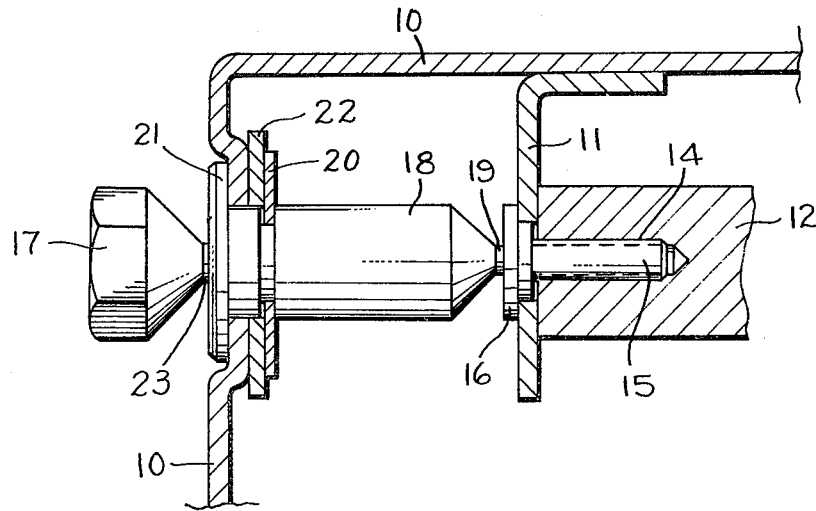

Now referring to FIG. 1, the inventive break-off screw is shown in an unassembled state. Cover 10 (shown in section view) is typically the outer shell of a postage meter. Cover 10 has an internal flange plate 11, which is to be fastened to internal frame member 12. Frame member 12 contains a threaded hole 14 which receives a threaded shaft 15 of the inventive screw. Threaded shaft 15 has a screw head portion 16 for anchoring the cover flange plate 11 to the meter frame member 12. When the flange 11 is attached to the frame 12, the cover 10 which is secured to the flange 11, is likewise anchored to the frame.

The inventive break-off screw consists of three major parts:

a. an installation head 17 which can be in the form of a hex-nut, or a screw head;

b. an intermediate shaft 18; and c. the aforementioned threaded fastener shaft 15.

The intermediate shaft 18 is connected to the fastener section 15 via a narrow necked shaft 19. The intermediate section is rotatively affixed to the cover plate 10 by means of a retaining ring 20 and a flat head member 21. A washer 22 disposed between the retaining ring 20 and the cover 10 acts to protect the retaining ring 20 from attack from outside tools. Washer 22 makes it much more difficult to remove or displace the retainer.

The head section 17 is attached to the intermediate section 18 by means of a second narrow necked shaft 23.

OPERATION OF THE INVENTION

Figure 2:
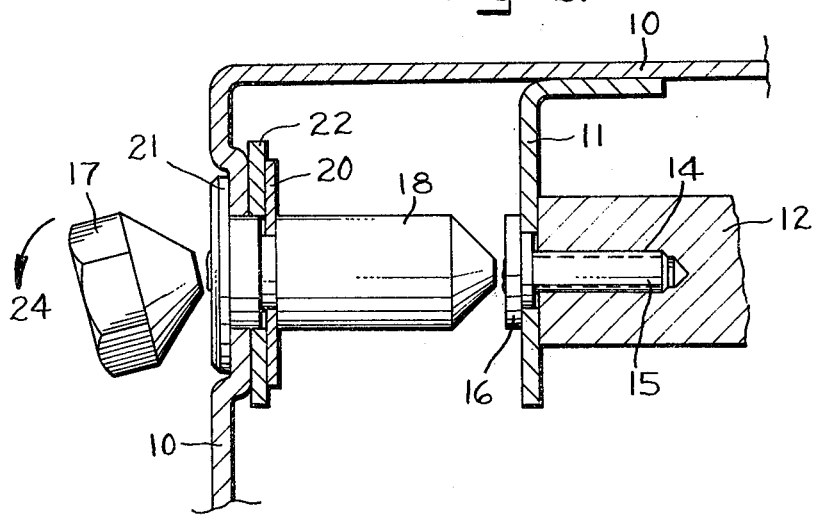

The operation of the break-off screw of this invention will be explained with reference to FIG. 2.

In order to fasten the cover plate 10 to the frame 12 of the postage meter, the flange 11 is secured to frame 12 via threaded shaft 15 as aforementioned. This attachment provides a hidden securement for the cover 10, which is useful to foil and confuse would-be meddlers.

In order to fasten the screw 15 into the frame 12, the hex-nut 17 is rotated so as to rotate intermediate shaft 18, which in turn, rotates shaft 15.

When shaft 15 seats within the threaded hole 14, further rotation of the hex-nut 17 and the intermediate shaft 18, will cause the break-off shaft 19 (FIG. 1) to torsionally shear, as illustrated.

The hex-nut 17 is now bent (arrow 24) about the intermediate shaft 18, causing the break-off shaft 23 (FIG. 1) to flexurally shear as shown.

The flat head portion 21 of the intermediate shaft 18 now rests flush with cover 10 and is freely rotatable. A would-be meddler who may now attempt to tamper with the head 21, will find that turning this rivet-like head will provide no apparent unloosening of the cover or any internal parts.

If the head 21 is attempted to be pried loose, it will be very difficult to do so, due to the aforementioned washer 22 and retaining ring 20.

If tampering continues, a large hole will be made in the cover plate 10, before the meddler will actually be able to tear the head 21 and the intermediate shaft 18 loose from the cover. At this juncture in time, it would be extremely difficult for the thief to conceal his attempted tampering, or to repair the hole left in the cover. At this point the thief is left with a gaping hole in the cover, and the cover is still absolutely secured, as before, to the frame 12 of the meter. If the thief is not yet discouraged, he must now drill out the threaded screw 15 from the hole 14. The screw 15 being in an inaccessible or difficult to reach spot within the meter, removing the screw becomes extremely difficult.

The retaining ring 20 and the washer 22 may be either flat or bowed.

Many modifications and changes will naturally occur to the experienced practitioner in this art. All modifications of an obvious nature to those skilled in the art are deemed to lie within the spirit and scope of the invention. The invention should be interpreted with reference to the appended claims.

What is claimed is:

1. A double break-off screw for use with a security cover plate and an inner retaining member disposed within said cover plate, said double break-off screw having three sections and comprising:
   a fastening section having screw threads and fastening to said inner retaining member by torsional means;
   an intermediate section disposed between said security cover and said inner retaining member, said intermediate section connected to said fastening section on one end thereof by means of a narrowed torsional break-off section, and connected to said security cover plate on an opposite end thereof; and
   a rotatable installation section connected to said intermediate section by means of a narrowed break-off section, said installation section being disposed externally of said security cover plate, and being rotatable to drive said fastening section into said inner retaining member until seated, whereby said intermediate section will shear from said fastening section about said torsional break-off section as said installation section is further rotated, said installation section then being removable from said intermediate section about the narrowed break-off section disposed therebetween.

2. The double break-off screw of claim 1, wherein said installation section is caused to be bent about said intermediate section and the narrowed break-off section disposed between said installation section and said intermediate section fails in shear as said installation section is caused to be bent.

3. The double break-off screw of claim 1, wherein the intermediate section is rotatively affixed to said security cover plate by means of a retaining ring and a head portion, said retaining ring being disposed within said security cover plate, and said head portion being disposed externally of said security cover plate.

4. The double break-off screw of claim 1, wherein said installation section comprises a torsional nut.

5. A double break-off screw having a plurality of sections, comprising:
   a fastening section having a threaded shaft for torsional fastening purposes;
   a first break-off section connected to said fastening section and having a cross-section of narrower width than said fastening section;
   an intermediate section comprising a shaft connected to said first break-off section at one end thereof;
   a second break-off section connected to said intermediate section about an end opposite to the first break-off section end, and having a crosssection of narrower width than said intermediate section; and
   an installation section having a torsional head member connected to said second break-off section.

6. The double break-off screw of claim 5, wherein said intermediate section is disconnectable from said fastening section by torsionally shearing said first break-off section.

7. The double break-off screw of claim 5, wherein said installation section is disconnectable from said intermediate section by means of flexurally shearing said second break-off section.

8. A double break-off screw comprising a head section, an intermediate shaft section, and a threaded shaft fastening section, a first narrow break-off shaft disposed between said threaded fastening section and said intermediate section, said first break-off section being caused to torsionally shear when said intermediate section is rotated after said fastening section is caused to seat, a second narrow break-off shaft disposed between said head section and said intermediate section, said second break-off section being caused to flexurally shear when said head section is bent about said intermediate section.

9. The double break-off screw of claim 8, wherein said head section has the shape of a torsionally grippable nut, and each of said intermediate and said fastening shaft sections comprise a flat head member.

* * * * *